Patented Feb. 4, 1936

2,029,531

UNITED STATES PATENT OFFICE 2,029,531

CONTACT SULPHURIC ACID PROCESS

Alphons O. Jaeger, Mount Lebanon, Pa., assignor, by mesne assignments, to American Cyanamid & Chemical Corporation, a corporation of Delaware No Drawing. Application May 29, 1931,
Serial No. 541,119

4 Claims. (Cl. 23—175)

This invention relates to the catalytic oxidation of sulphur dioxide to sulphur trioxide, the contact sulphuric acid process, by means of a new class of catalysts.

According to the invention, catalysts are used which contain oxides or salts of metals of the 5th and 6th groups of the periodic system, such as vanadium, chromium, molybdenum, tungsten, and the like, together with promoters consisting of compounds such as oxides, metallates or salts of metals which are catalytically active but which are not effective catalysts, when used alone, for the contact sulphuric acid process. I have found that the presence of such non-specific catalysts or promoters increases the activity of the specific catalysts for the contact sulphuric acid process and causes them to have a much longer effective life.

In my prior Patent No. 1,657,754 I have described catalysts in which compounds of catalytically active metals are incorporated into base exchange bodies, notably zeolites. These zeolites, by reason of their microporous structure and high surface activity, operate as powerful physical activators for the vanadium compounds and other catalysts associated therewith, and produce the most highly active sulphuric acid catalysts that have so far been developed. In fact, this physical activation is so great that it completely masks the action of any chemical promoter that may be present as a zeolite component or diluent, and renders it impossible to determine the effect of such promoters on the action of vanadium compounds if used independently of a zeolite. Accordingly I have used the term "non-base exchanging compound of vanadium" in the present claims to define a vanadium catalyst which is free from this physical activation imparted by zeolites and which is therefore capable of being chemically activated by association with a promoter.

While any of the effective catalytically active metals of the 5th and 6th groups of the periodic system may be used, in the form of their oxides, metallates or salts, the vanadium compounds form the preferred class since these exhibit the highest catalytic activity over long periods of time. In conjunction with the vanadium compounds, promoters such as oxides or salts of aluminum, cobalt, nickel or silver may be present either singly or in admixture and the metals which are sufficiently amphoteric may be present in the form of their metallates. The composite catalysts so obtained are preferably supported on carriers, and for this purpose I have found that materials rich in silica, such as diatomaceous earth, kieselguhr, diatomite brick refuse, and the like, are expecially suitable, since silica is an activator for sulphuric acid catalysts.

The contact mass is preferably stabilized by the addition of compounds of alkali or alkaline earth metals, which may be present in the freshly prepared catalysts in the form of oxides, hydroxides or salts. The stabilizer may also be present in chemical combination with the specific catalyst, for example as the sodium of sodium vanadate, or it may be combined with the non-specific catalyst when the latter is present as a metallate. Similarly, complex compounds may be used which contain both the specific catalyst or promoters and the non-specific catalyst, for example such compounds as aluminum polyvanadate, but the base exchange compounds and complex, catalytically effective silicates are not included in the present invention since these form the subject matter of my prior applications, Serial No. 290,280 filed July 3, 1928, now Patent No. 1,741,310, dated December 31, 1929 and Serial No. 334,365 filed January 22, 1929, now Patent No. 1,885,833, dated November 1, 1932.

The catalysts for use in the present invention are prepared by impregnating or precipitating the desired components upon the carrier material which is then formed into pellets and dried, and given a preliminary calcination with air or $SO_2$ or $SO_3$ gases, or mixtures of these, before use. During this preliminary calcination, and also during the first stages of use, the catalyst may undergo secondary changes such as the neutralization of basic components by the acid gases, and it is to be understood that catalysts which have been subjected to such secondary changes are included within the scope of the invention.

The invention will be more specifically illustrated in connection with the following examples, which are for illustrative purposes only and to which it is not limited.

*Example 1*

350 parts of kieselguhr powder, either as it occurs in nature or after trituration, which may previously have been heated to red heat in order to burn out organic materials, are impregnated with 145 parts of $Al_2(SO_4)_3.18H_2O$. The slurry so obtained is treated with 120 c. c. of a 20% ammonia or alkali solution, in order to precipitate out aluminum oxide uniformly within the finely divided kieselguhr. Instead of using aluminum salt solutions, solutions of other metal salts, such as cobalt, nickel or copper, alone or in admixture, may be used.

The impregnated, finely divided kieselguhr so obtained can be washed free from soluble salts. The material so obtained is impregnated with 45 parts of ammonium vanadate and, after drying, pressed into pellets, with or without the addition of small amounts of calcium compounds, such as 10–20 parts of calcium hydroxide, etc.

Instead of kieselguhr, other finely divided materials rich in silica may be used.

The contact mass so prepared gives from 92–96% conversion efficiency in using 200 c. c. of contact mass and 135 liters of 7% SO₂ gases when a temperature gradient of 500–425° C. is maintained during the operation.

*Example 2*

600 parts of finely divided kieselguhr are impregnated with metal oxides as defined in Example 1. Instead of metal oxides, complex compounds such as non-base exchanging aluminum polysilicates or ammonia complex compounds may be precipitated out in finely divided form.

In many cases it is of advantage to precipitate out, on the kieselguhr, in addition to the metal compounds mentioned, calcium carbonate, obtained by impregnation with 25 parts of calcium chloride solution and precipitating with sodium carbonate.

The soluble salts thereby obtained in the suspension may be removed in the usual manner. The mass so obtained is made up to a slurry with water in which 100 parts of sodium or potassium metavanadate are dissolved. After evaporation to dryness, the material is formed into pellets. These pellets are then treated at room or somewhat elevated temperature with SO₂ containing gases and then are filled into the converter.

A test with the catalyst so obtained shows that 200 c. c. of catalyst at a temperature gradient of 500–420° C. convert 150 liters of 7–8% burner gases per hour with a conversion efficiency of about 98%.

The contact mass so obtained is very resistant against fusion at high temperatures and also maintains its catalytic activity during long periods of use.

In the specification and claims, the term "alkali-forming metal" is used to cover the alkali metals and the alkaline earth metals and is intended to have no other meaning. The term "non-specific catalyst" defines an aluminate or compound which is a catalyst for vapor phase reactions other than the contact sulphuric acid process, but is not a specific catalyst for the said process. The term "metallate" is used to cover a salt of a metal acid. A typical metallate is sodium aluminate.

What is claimed as new is:

1. A process of oxidizing sulphur dioxide to sulphur trioxide which comprises bringing about reaction between sulphur dioxide and oxygen containing gases in the presence of a catalyst comprising at least one nonbase exchanging compound of vanadium, at least one compound of an alkali forming metal, and at least one compound of aluminum, the catalyst being associated with a catalytically inactive siliceous carrier.

2. A process of oxidizing sulphur dioxide to sulphur trioxide which comprises bringing about reaction between sulphur dioxide and oxygen containing gases in the presence of a catalyst comprising at least one nonbase exchanging compound of vanadium, at least one compound of an alkali forming metal, and at least one aluminate, the catalyst being associated with a catalytically inactive siliceous carrier.

3. A catalyst comprising kieselguhr impregnated with an oxide of vanadium which is not a part of the molecule of a base-exchanging body, a compound of an alkali forming metal, and an aluminum compound and formed into pellets.

4. A catalyst comprising pellets formed of kieselguhr impregnated with an oxide of vanadium which is not a part of the molecule of a base-exchanging body, a compound of an alkali forming metal and a compound of aluminum, which have been subjected to heating in the presence of acid gases.

ALPHONS O. JAEGER.